No. 628,692. Patented July 11, 1899.
A. CAMPBELL.
FLEXIBLE JOINT.
(Application filed May 1, 1899.)

(No Model.)

Witnesses.
J. H. Stunning
Lillian D. Kelsey

Albert Campbell
Inventor
By Atty. Seymour & Earle

THE NORRIS PETERS CO., PHOTO-LITHO., WASHINGTON, D. C.

United States Patent Office.

ALBERT CAMPBELL, OF STAMFORD, CONNECTICUT.

FLEXIBLE JOINT.

SPECIFICATION forming part of Letters Patent No. 628,692, dated July 11, 1899.

Application filed May 1, 1899. Serial No. 715,106. (No model.)

*To all whom it may concern:*

Be it known that I, ALBERT CAMPBELL, of Stamford, in the county of Fairfield and State of Connecticut, have invented a new Improvement in Flexible Joints; and I do hereby declare the following, when taken in connection with the accompanying drawings and the letters of reference marked thereon, to be a full, clear, and exact description of the same, and which said drawings constitute part of this specification, and represent, in—

Figure 1:
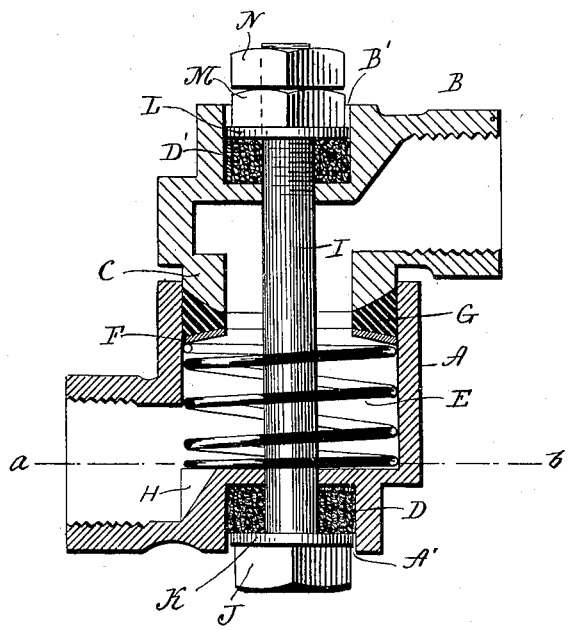
Figure 2:
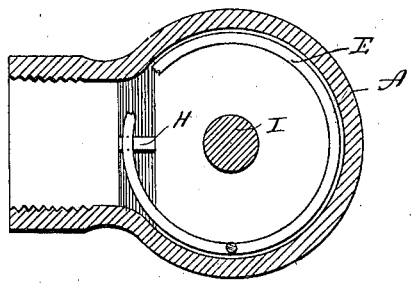

Figure 1, a vertical sectional view of a flexible joint constructed in accordance with my invention; Fig. 2, a transverse sectional view on the line $a\,b$ of Fig. 1.

This invention relates to an improvement in flexible joints such as are used in conduits for connecting sections of steam, water, compressed-air or other pipes in which it is desirable that the pipes shall be coupled for being turned in various directions and is an improvement on the construction set forth in Letters Patent of the United States No. 525,884, granted to me September 11, 1894.

The object of this invention is to produce a flexible joint which will be tight and which will provide means for taking up for wear; and it consists in the construction as hereinafter described, and particularly recited in the claims.

As in my patent above referred to, the joint consists of two members A B, the said member B formed with a projection C, having a spherical face, adapted to enter the member A, the upper end of which corresponds in diameter to the diameter of the said projection C. The said members are both provided with screw-threaded openings for the connection of the conduit-pipes. (Not shown.) The member A is constructed with a recess A' and the member B with a corresponding recess B', in which are placed packing-washers D D', preferably of asbestos or other similar material. Within the member A, I place a spiral spring E, over which is located a transversely-bowed metal washer F, which forms a seat for a packing-ring G, of asbestos, leather, or other suitable material, upon which the inner end of the projection C rests. As a support for one side of the lower end of the spring I form a web H within the member A and as an integral part thereof. Extending through the said two members is a bolt I, the head J of which rests upon a metal washer K, which in turn bears upon the packing-washer D in the recess A'. Over the end of the bolt which projects through the recess B' is placed a metal washer L, and onto the threaded end of the bolt I are turned a nut M and lock-nut N. By turning the nut M the members of the coupling are drawn together and so as to crowd the projection C into the member A, and the joint between the two will be tightly closed by the packing-ring G, which is forced against the projection by the said spring E, and the nut M is held against reverse movement by the lock-nut N.

With this construction as the parts become worn or the packing-ring G becomes compressed the joint may be closed by turning the nut M to draw the parts together. The opening around the bolt as it projects beyond the members is packed by the washers D D'.

The metal washers K L are employed to permit the turning of the head or nut without cutting the packing-washers D D'.

With this construction a flexible joint is produced which is as simple as my previous construction, equally as tight, and flexible to a slightly-greater degree, as the projection C may rock slightly in the member A.

Having fully described my invention, what I claim as new, and desire to secure by Letters Patent, is—

1. A flexible joint comprising two members, one of which is formed with a projection adapted to enter the other member, a spring in said other member and supporting a packing-ring, whereby the joint between the two members is closed, a bolt extending through said members whereby they are coupled together, substantially as described.

2. A flexible joint, comprising two members, one of which is formed with a projection adapted to enter the other member, said other member formed with a spring-seat, a spring in said other member and supporting a packing-washer, whereby the joint between the two parts is closed, said two members formed with recesses, a bolt extending through said two members and into the recesses thereof, and packing-washers around the ends of said bolt, substantially as described.

3. A flexible joint, comprising two members, one of which is formed with a projection adapted to enter the other member, a spring supporting a transversely-bowed metal washer and a packing-ring, whereby the joint between the two members is closed, a bolt extending through said members, whereby they are connected together, and packings providing tight joints around said bolts, substantially as described.

In testimony whereof I have signed this specification in the presence of two subscribing witnesses.

ALBERT CAMPBELL.

Witnesses:
   JOHN H. BROWN,
   EDWARD DUFFY.